(12) United States Patent
Suzuki et al.

(10) Patent No.: US 7,856,559 B2
(45) Date of Patent: Dec. 21, 2010

(54) PACKET COMMUNICATION NODE APPARATUS FOR AUTHENTICATING EXTENSION MODULE

(75) Inventors: Toshiaki Suzuki, Kunitachi (JP); Hideki Okita, Kokubunji (JP); Kunihiko Toumura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1197 days.

(21) Appl. No.: 11/248,474

(22) Filed: Oct. 13, 2005

(65) Prior Publication Data

US 2006/0083223 A1    Apr. 20, 2006

(30) Foreign Application Priority Data

Oct. 20, 2004    (JP) .............................. 2004-305775

(51) Int. Cl.
G06F 11/30    (2006.01)
(52) U.S. Cl. ........................................ 713/193; 710/20
(58) Field of Classification Search .................... 726/36
See application file for complete search history.

(56) References Cited

U.S. PATENT DOCUMENTS

| | | | | |
|---|---|---|---|---|
| 6,032,257 A * | 2/2000 | Olarig et al. | ............... | 726/35 |
| 6,590,907 B1 * | 7/2003 | Jones et al. | ............... | 370/489 |
| 6,654,796 B1 * | 11/2003 | Slater et al. | ............... | 709/220 |
| 6,810,481 B1 | 10/2004 | Kawade et al. | | |
| 7,042,596 B1 | 5/2006 | Yoshida | | |
| 7,302,572 B2 * | 11/2007 | Shinriki et al. | ............... | 713/172 |
| 7,443,868 B2 * | 10/2008 | Suzuki et al. | ............... | 370/401 |
| 2002/0019932 A1 * | 2/2002 | Toh et al. | ............... | 713/155 |

(Continued)

FOREIGN PATENT DOCUMENTS

EP    422795 A2 *    4/1991

(Continued)

OTHER PUBLICATIONS

Kunihiko Toumura et al., "Study of Modular IP Node Architecture", IECE Technical Report, The Institute of Electronics, Information and Communication Engineers (IEICE), Nov. 13, 2003, vol. 103, No. 442, pp. 59-62, in Japanese with English translation.

(Continued)

Primary Examiner—William R Korzuch
Assistant Examiner—Michael R Vaughan
(74) Attorney, Agent, or Firm—Stites & Harbison, PLLC; Juan Carlos A. Marquez, Esq

(57) ABSTRACT

A module type node apparatus for packet communication of this invention includes an extension module for executing predetermined processing and a node apparatus main body for forwarding packet data to the extension module, the extension module including a memory for storing connectivity authentication data, and a module controller for transmitting the connectivity authentication data stored in the memory to the node apparatus main body for packet communication when the connectivity authentication data is requested from the node apparatus main body for packet communication, the node apparatus main body for packet communication being characterized by further including a connectivity authentication unit for authenticating permission of connection of the extension module based on the connectivity authentication data received from the extension module, and a connection controller for receiving the packet data from the extension module when the connectivity authentication unit permits the connection.

5 Claims, 14 Drawing Sheets

U.S. PATENT DOCUMENTS

| | | |
|---|---|---|
| 2002/0032854 A1 | 3/2002 | Chen et al. |
| 2002/0150114 A1 | 10/2002 | Sainomoto et al. |
| 2002/0169913 A1* | 11/2002 | Heizer et al. ................ 710/302 |
| 2003/0161319 A1 | 8/2003 | Okagawa et al. |
| 2004/0071142 A1 | 4/2004 | Moriwaki et al. |
| 2004/0117623 A1 | 6/2004 | Kalogridis et al. |
| 2004/0136368 A1 | 7/2004 | Wakayama et al. |
| 2004/0156374 A1* | 8/2004 | Lee et al. .................... 370/401 |
| 2004/0184453 A1 | 9/2004 | Moriwaki |
| 2004/0230703 A1 | 11/2004 | Sukigara |
| 2004/0247118 A1* | 12/2004 | Tateno et al. ................. 380/44 |
| 2006/0036720 A1* | 2/2006 | Faulk, Jr. .................... 709/223 |
| 2006/0136722 A1* | 6/2006 | Ogura et al. ................ 713/168 |
| 2008/0196103 A1* | 8/2008 | Lin et al. ..................... 726/24 |

FOREIGN PATENT DOCUMENTS

| | | |
|---|---|---|
| EP | 1 365 546 A1 | 5/2002 |
| JP | 09-237198 | 2/1996 |
| JP | 2001-067304 | 8/1999 |
| JP | 2001-075682 | 9/1999 |
| JP | 2002-281070 | 3/2001 |
| JP | 2002-368763 | 6/2001 |
| JP | 2003-258842 | 2/2002 |
| JP | 2003-283571 | 3/2002 |
| JP | 2003-338834 | 10/2002 |
| JP | 2004-135106 | 10/2002 |
| JP | 2004-221805 | 1/2003 |
| JP | 2004-289223 | 3/2003 |
| JP | 2004-166238 | 9/2003 |
| JP | 2005-167761 | 12/2003 |
| JP | 2004-158044 | 2/2004 |

OTHER PUBLICATIONS

Office Action from Japanese Patent Office dated Jan. 19, 2010, in Japanese.

* cited by examiner

FIG. 4

| FLOW DEFINITION | INTERNAL ADDRESS |
|---|---|
| DESTINATION IP ADDRESS = IP5 ( CLIENT ) | P41 |
| ... | ... |
| ... | ... |

60A / 60B / 601

16 FORWARDING TABLE

FIG. 5

| DESTINATION IP ADDRESS | INTERNAL ADDRESS |
|---|---|
| IP10 ( NODE CONTROL UNIT 10 ) | P10 |
| IP51 ( EXTENSION MODULE 51 ) | P41 |
| IP4 ( SERVER 4 ) | P31 |
| IP5 ( CLIENT 5 ) | P3n |
| ... | ... |

61A / 61B / 611 / 612 / 613 / 614

17 DESTINATION TABLE

AUTHENTICATION TABLE 63

| ITEM FOR AUTHENTICATION | CONDITIONS |
|---|---|
| AUTHENTICATION DATA | xyz!?ABC |
| POWER CONSUMPTION | 100 WATTS OR LESS |
| . . . | . . . |

*FIG.8*

AUTHENTICATION ANSWER TABLE 64

| REPLY ITEM FOR AUTHENTICATION | ANSWER DATA |
|---|---|
| AUTHENTICATION DATA | xyz!?ABC |
| POWER CONSUMPTION | 80 WATTS |
| . . . | . . . |

*FIG.9* ered in the module server in advance. Then,
the module server transmits the software program module
only to node apparatuses for packet communication managed
by the registered users.

PACKET COMMUNICATION NODE APPARATUS FOR AUTHENTICATING EXTENSION MODULE

CLAIM OF PRIORITY

The present application claims priority from Japanese patent application P2004-305775 filed on Oct. 20, 2004, the content of which is hereby incorporated by reference into this application.

BACKGROUND OF THE INVENTION

This invention relates to a node apparatus for packet communication, which is designed to forward packet data, and more particularly to a technology for complete connection of an extension module.

Conventionally, the node apparatus for packet communication has a processing unit, a network interface, and a switching unit. The processing unit executes a routing program to create a destination table. The network interface receives and forwards packet data with a network line. The switching unit connects the network interface with another interface.

Upon reception of a packet, the network interface retrieves internal routing information of the packet from the destination table. Next, the network interface adds the retrieved internal routing information to the packet, and forwards the packet to the switching unit. The switching unit extracts the internal routing information from the forwarded packet. Then, the switching unit forwards the packet to the network interface according to the extracted internal routing information. In this manner, the node apparatus for packet communication forwards the packet.

Recent popularization of an Internet Protocol (IP) network has heightened a communication speed and further a level of operation. As a result, the node apparatus for packet communication is now required to provide processing functions requested by a user in addition to the basic packet forwarding operation.

JP 2004-158044 A discloses a conventional technology of providing processing functions required by a user. According to this conventional technology, authenticated program modules are stored in a module server.

The software program module provides a processing function required by the user. In response to a request from the user, the module server transmits the software program module to the node apparatus for packet communication. Upon reception of the software program module, the node apparatus for packet communication executes the received software program module.

This conventional technology is characterized by authentication of developers of software programs. Specifically, data of a developer of the software program module is registered in the module server in advance. Then, a digital signature of the developer added to the software program module is compared with the preregistered data of the developer so that the software program module can be authenticated.

The conventional technology is further characterized by authentication of users who use the software program module. Specifically, the users who utilize the software program module are registered in the module server in advance. Then,

SUMMARY OF THE INVENTION

However, the following three problems occur in the case of the conventional technology.

A first problem relates to the fact that data of developers must be registered in the module server when more developers develop software program modules. A second problem relates to the fact that users must be registered when more users use software program modules. A third problem resides in that the conventional technology can be realized for hardware modules.

It is therefore an object of this invention to provide a node apparatus for packet communication, which can realize processing functions as hardware modules and execute authentication without any need to register data of developers or users.

A module type node apparatus for packet communication according to a representative embodiment of this invention includes an extension module for executing predetermined processing and a node apparatus main body for forwarding packet data to the extension module, the extension module including a memory for storing connectivity authentication data, and a module controller for transmitting the connectivity authentication data stored in the memory to the node apparatus main body for packet communication when the connectivity authentication data is requested from the node apparatus main body for packet communication, the node apparatus main body for packet communication being characterized by further including a connectivity authentication unit for authenticating permission of connection of the extension module based on the connectivity authentication data received from the extension module, and a connection controller for receiving the packet data from the extension module when the connectivity authentication unit permits the connection.

According to the representative embodiment of this invention, the extension module whose function, performance and safety are guaranteed can be connected to the node apparatus for packet communication.

BRIEF DESCRIPTION OF THE DRAWINGS

The present invention can be appreciated by the description which follows in conjunction with the following figures, wherein:

FIG. 4 is a configuration diagram of a forwarding table according to the first embodiment of this invention;

FIG. 5 is a configuration diagram of a destination table according to the first embodiment of this invention;

FIG. 8 is a configuration diagram an authentication condition table of the module connectivity authentication interface according to the first embodiment of this invention;

FIG. 9 is a configuration diagram of an authentication answer table of the extension module according to the first embodiment of this invention;

DETAILED DESCRIPTION OF THE INVENTION

Embodiments of this invention will be described below in detail with reference to the accompanying drawings.

First Embodiment

Figure 1:
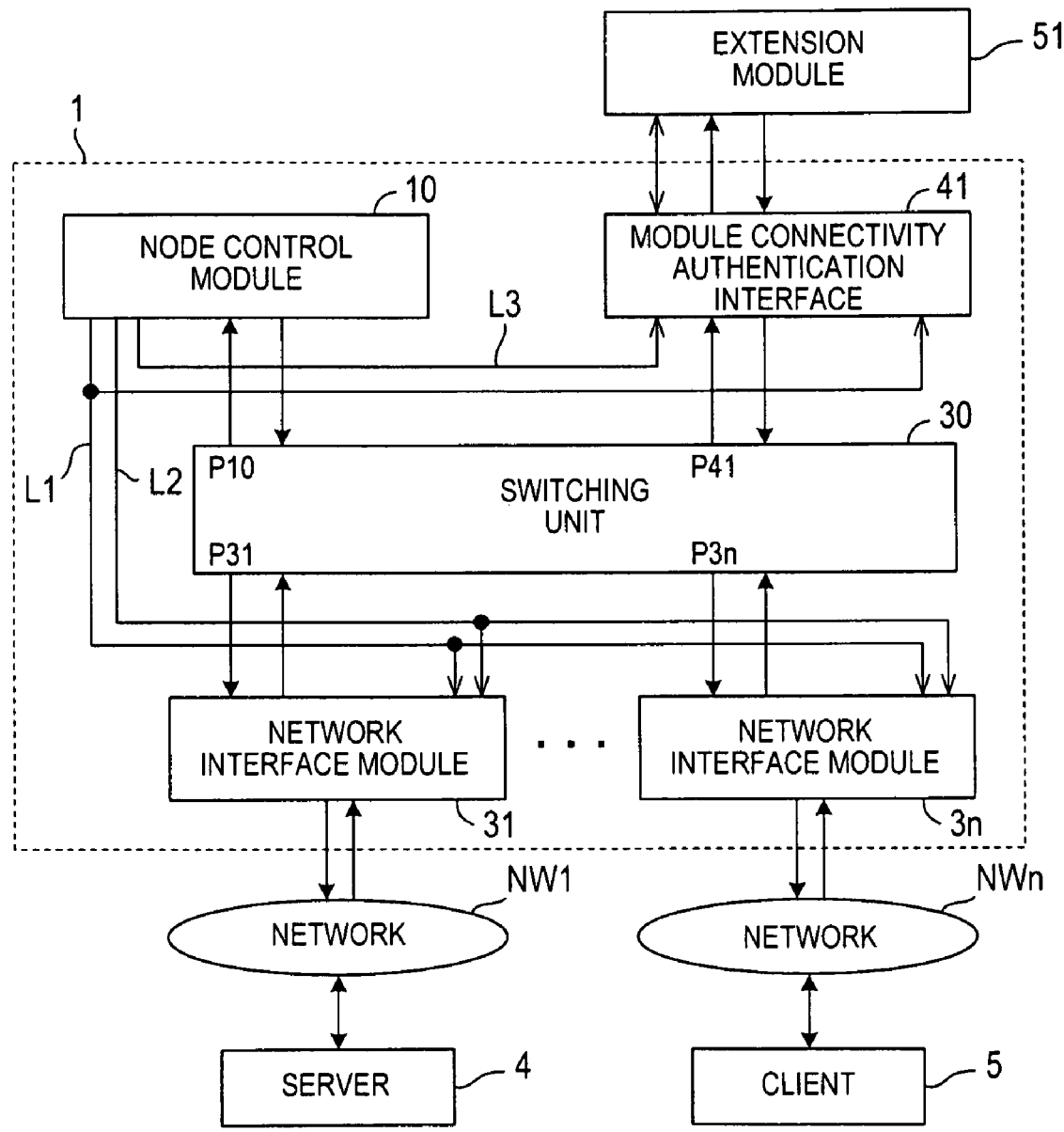
FIG. 1 is a block diagram of a node apparatus for packet communication according to a first embodiment of this invention.

FIG. 1 is a block diagram of a node apparatus for packet communication according to a first embodiment of this invention.

A node apparatus 1 for packet communication includes a node control module 10, a switching unit 30, a plurality of network interface modules 31 to 3n, and a module connectivity authentication interface 41. An extension module 51 is connected to the node apparatus 1 for packet communication.

As described later in detail by referring to FIG. 3, the node control module 10 controls the network interface modules 31 to 3n and the module connectivity authentication interface 41.

The node control module 10 is connected through a signal line L1 to the network interface modules 31 to 3n and the module connectivity authentication interface 41. It should be noted that through the signal line L1, communication of a direction from the node control module 10 to the network interface modules 31 to 3n or the module connectivity authentication interface 41 is permitted while communication of an opposite direction is not.

The node control module 10 is connected through a signal line L2 to the network interface modules 31 to 3n. It should be noted that through the signal line L2, communication of a direction from the node control module 10 to the network interface modules 31 to 3n is permitted while communication of an opposite direction is not.

Additionally, the node control module 10 is connected through a signal line L3 to the module connectivity authentication interface 41. It should be noted that through the signal line L3, communication of a direction from the node control module 10 to the module connectivity authentication interface 41 is permitted while communication of an opposite direction is not.

The module connectivity authentication interface 41 is connected to the extension module 51. One module connectivity authentication interface 41 is shown, but a plurality thereof may be installed.

The extension module 51 includes a packet data measuring function. Further, a function, performance and safety thereof must be guaranteed. However, the extension module 51 may include other functions such as video data transcoder function and a data encoder function.

The network interface module 31 is connected to a network NW1. Similarly, the network interface module 3n is connected to a network NWn. A server 4 is connected to the network NW1. A client 5 is connected to the network NWn. The server 4 transmits an IP packet to the client 5 via the node apparatus 1 for packet communication.

The switching unit 30 includes an input port and output ports P10, P31 to P3n, and P41. The switching unit 30 refers to an internal header to forward an internal packet described later by referring to FIG. 2. The output port 10 is connected to the node control module 10, the output ports P31 to P3n are connected to the network interface modules 31 to 3n, and the output port P41 is connected to the module connectivity authentication interface 41.

Figure 2:
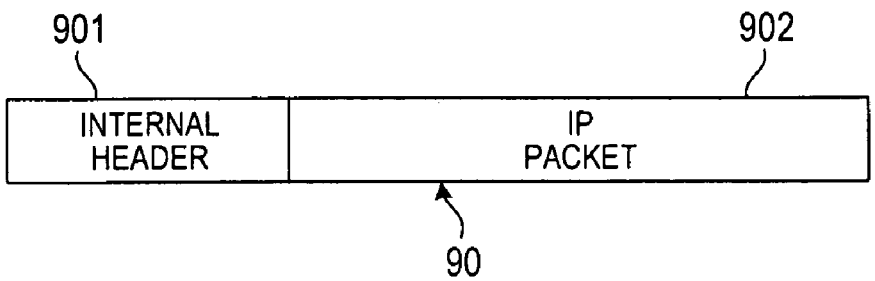
FIG. 2 is a configuration diagram showing a structure of an internal packet according to the first embodiment of this invention.

FIG. 2 is a diagram showing a structure of an internal packet according to the first embodiment of this invention.

An internal packet 90 includes an internal header 901 and an IP packet 902. The IP packet 902 is packet data which the network interface modules 31 to 3n receive from the networks NW1 to NWn. The internal header 901 stores an output port number (internal address) through which the switching unit 30 outputs a packet.

Figure 3:
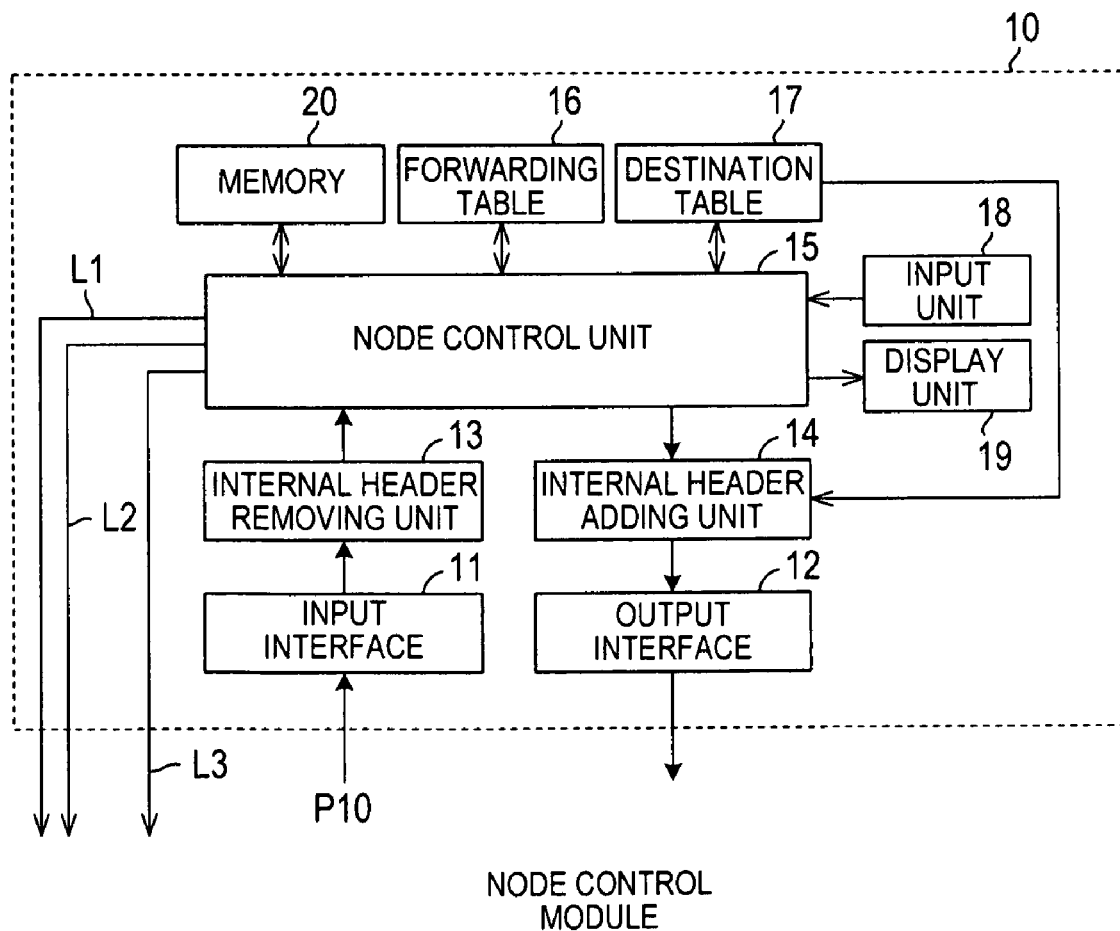
FIG. 3 is a block diagram of a node control module according to the first embodiment of this invention.

FIG. 3 is a block diagram of the node control module 10 according to the first embodiment of this invention.

The node control module 10 includes an input interface 11, an output interface 12, an internal header removing unit 13, an internal header adding unit 14, a node control unit 15, a forwarding table 16, a destination table 17, an input unit 18, a display unit 19, and a memory 20.

The input interface 11 is connected to the output port P10 of the switching unit 30 to receive the internal packet 90. The output interface 12 is connected to the input port of the switching unit 30 to transmit the internal packet 90.

The internal header removing unit 13 removes the internal header 901 from the internal packet 90 received by the input interface 11. The internal header adding unit 14 refers to the destination table 17 to add the internal header 901 to the IP packet 902 received from the node control unit 15.

The forwarding table 16 described later by referring to FIG. 4 shows correspondence between flow information of the IP packet 902 and an internal address for the extension module 51 for processing the IP packet 902. The destination table 17 described later by referring to FIG. 5 shows correspondence between a destination IP address of the IP packet 902 and the internal address for forwarding.

The node control unit 15 updates the forwarding and destination tables 16 and 17. The node control unit 15 that has updated the destination table 17 updates a destination table 318 of the network interface modules 31 to 3n and a destination table 415 of the module connectivity authentication interface 41 through the signal line L1. Similarly, the node control unit 15 that has updated the forwarding table 16 updates a forwarding table 317 of the network interface modules 31 to 3n through the signal line L2.

The input unit 18 receives information from an administrator, and transmits the input information to the node control unit 15. The display unit 19 displays information received from the node control unit 15. The input and display units 18 and 19 may be interfaces connected to a computer for inputting information to the node control unit 15.

The memory 20 stores an IP address or the like of the node control module 10.

FIG. 4 shows a structure of the forwarding table 16 according to the first embodiment of this invention.

The forwarding table 16 includes flow definition information 60A and an internal address 60B.

The flow definition information 60A is flow information of the IP packet 902. For example, the flow definition information 60A contains a destination IP address and a transmission source IP address. The internal address 60B is a number of the output port P10 or the like through which the switching unit 30 outputs a packet.

For example, as indicated by an entry 601, the internal address 60B of the flow definition 60A "destination IP address=IP5" is "P41".

FIG. 5 shows a structure of the destination table 17 according to the first embodiment of this invention.

The destination table 17 includes a destination IP address 61A and an internal address 61B.

The destination IP address 61A is a destination IP address of the IP packet 902. The internal address 61B is a number of the output port P10 or the like through which the switching unit 30 outputs a packet.

Figure 6:
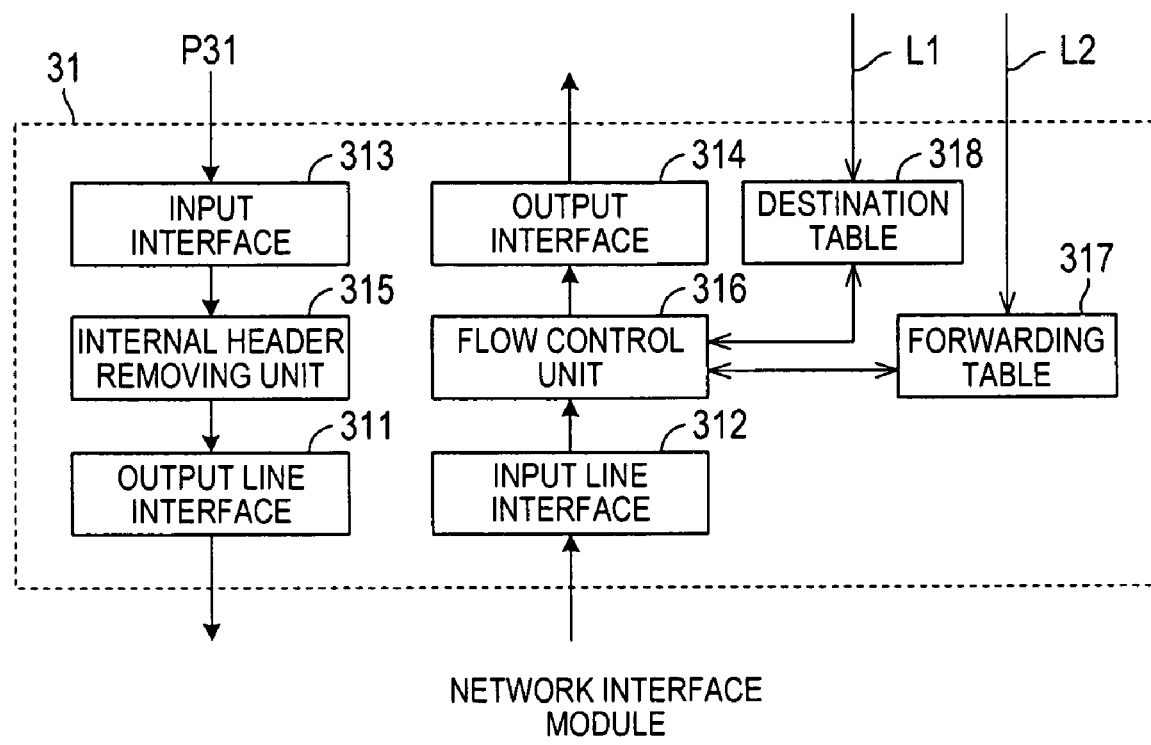
FIG. 6 is a block diagram of a network interface module according to the first embodiment of this invention.

FIG. 6 is a block diagram of the network interface modules 31 to 3n according to the first embodiment of this invention.

Each of the network interface modules 31 to 3n includes an output line interface 311, an input line interface 312, an input interface 313, an output interface 314, an internal header removing unit 315, a flow control unit 316, a forwarding table 317, and a destination table 318.

The output line interface 311 is connected to the networks NW1 to NWn to transmit the IP packet 902. The input line interface 312 is connected to the networks NW1 to NWn to receive the IP packet 902.

The input interface 313 is connected to the output port P31 of the switching unit 30 to receive the internal packet 90. The output interface 314 is connected to the input port of the switching unit 30 to transmit the internal packet 90.

The internal header removing unit 315 removes the internal header 901 from the internal packet 90. The flow control unit 316 refers to the forwarding and destination tables 317 and 318 to add the internal header 901 to the IP packet 902.

The forwarding table 317 stores the same contents as those of the forwarding table 16 of the node control module 10 shown in FIG. 4, showing correspondence between the flow information of the IP packet 902 and the internal address for the extension module 51 for processing the IP packet 902. The forwarding table 317 is updated by the node control module 10 through the signal line L2.

The destination table 318 stores the same contents as those of the destination table 17 of the node control module 10 shown in FIG. 5, showing correspondence between the destination IP address of the IP packet 902 and the internal address. The destination table 318 is updated by the node control module 10 through the signal line L1.

Next, description will be made of processing when the network interface modules 31 to 3n receive IP packets 902 from the networks NW1 to NWn.

First, the input line interface 312 receives the IP packet from each of the networks NW1 to NWn. Then, the input line interface 312 sends received IP packet 902 to the flow control unit 316.

The flow control unit 316 that has received the IP packet 902 extracts flow information from a header of the IP packet 902. Next, the flow control unit 316 retrieves an entry where the extracted flow information matches the flow definition information 60A from the forwarding table 317.

Upon discovery of the matched entry, the flow control unit 316 adds an internal header 901 containing an internal address 60B of the entry to the IP packet 902, and sends it to the output interface 314.

On the other hand, when no matched entry is discovered, the flow control unit 316 retrieves an entry where the extracted IP address matches a destination address 61A from the destination table 318. Next, the flow control unit 316 adds an internal header 901 containing an internal address 61B of the matched entry to the IP packet 902, and sends it to the output interface 314.

The output interface 314 that has received the internal packet 90 forwards it to the switching unit 30.

Figure 7:
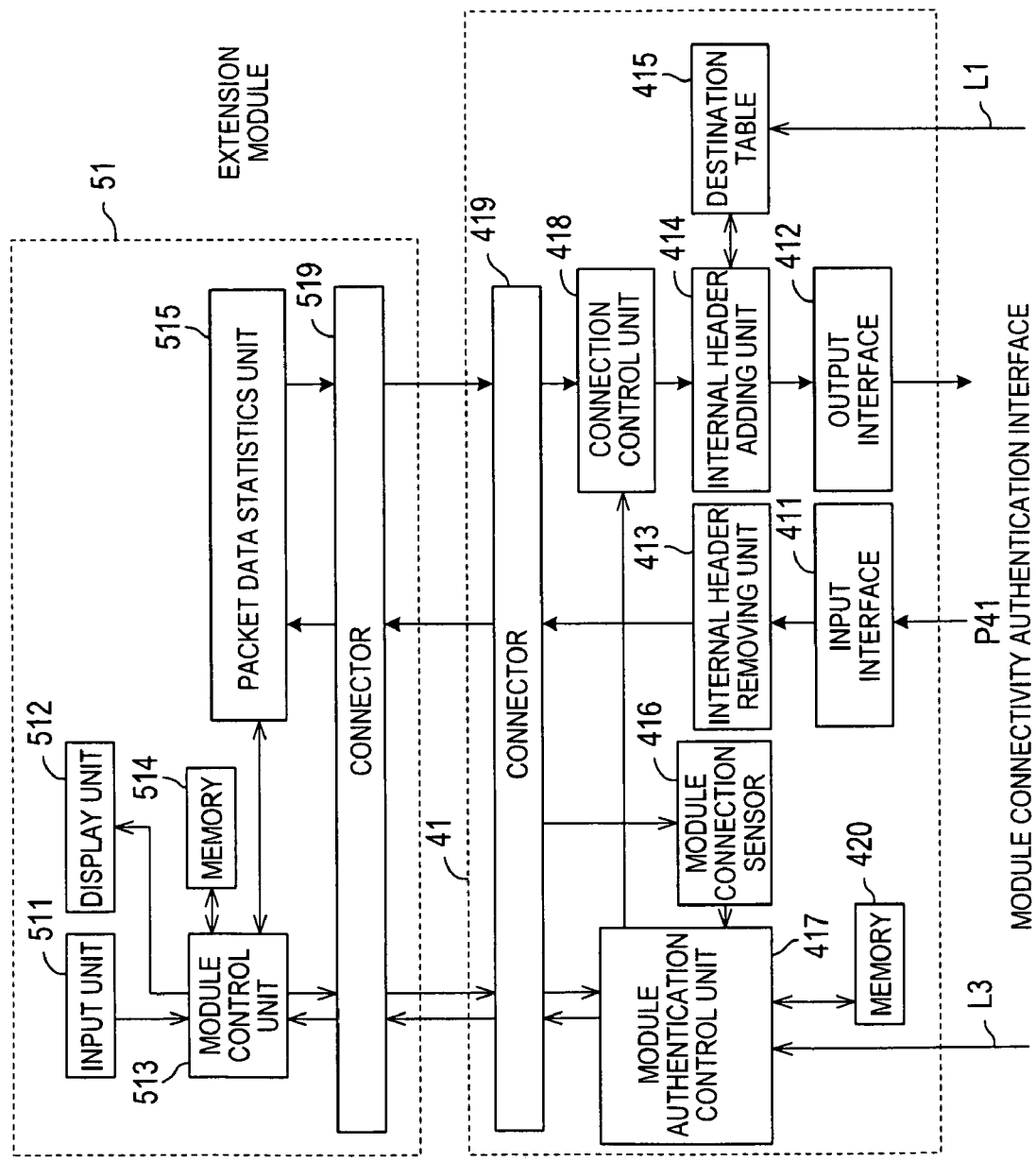
FIG. 7 is a block diagram of a module connectivity authentication interface and an extension module according to the first embodiment of this invention.

FIG. 7 is a block diagram of the module connectivity authentication interface 41 and the extension module 51 according to the first embodiment of this invention.

The module connectivity authentication interface 41 includes an input interface 411, an output interface 412, an internal header removing unit 413, an internal header adding unit 414, a destination table 415, a module connection sensor 416, a module authentication control unit 417, a connection control unit 418, a connector 419, and a memory 420.

The input interface 411 is connected to the output port P41 of the switching unit 30 to receive the internal packet 90. The output interface 412 is connected to the input port of the switching unit 30 to transmit the internal packet 90.

The internal header removing unit 413 removes the internal header 901 from the internal packet 90. The internal header adding unit 414 refers to the destination table 415 to add the internal packet 901 to the IP packet 902.

The destination table 415 stores the same contents as those of the destination table 17 of the node control module 10 shown in FIG. 5, showing correspondence between the destination IP address of the IP packet 902 and the internal address.

The connection control unit 418 controls packet reception from the extension module 51.

The module authentication control unit 417 authenticates the extension module 51. The memory 420 stores an authentication condition table or the like described later by referring to FIG. 8. The connector 419 is connected to a connector 519 of the extension module 51.

The module connection sensor 416 determines whether the extension module 51 is connected or not to the connector 419, and informs a result of the determination to the module authentication control unit 417. For example, the module connector sensor 416 is a pressure sensor, an electric sensor, or the like, and only needs to detect connection of the extension module 51 to the connector 419.

The extension module 51 includes an input unit 511, a display unit 512, a module control unit 513, a memory 514, a packet data statistics unit 515, and a connector 519.

The input unit 511 receives information from the administrator, and transmits the input information to the module control unit 513. The display unit 512 displays the information received from the module control unit 513. The input and display units 511 and 512 may be interfaces connected to the computer for inputting information to the module control unit 513.

The module control unit 513 controls the entire extension module 51.

The memory 514 stores an authentication answer table described later by referring to FIG. 9, address information, and the like.

The packet data statistics unit 515 measures the amount of data received from the module connectivity authentication interface 41.

FIG. 8 shows a structure of the authentication condition table 63 of the module connectivity authentication interface 41 according to the first embodiment of this invention.

The authentication condition table 63 includes items 63A for authentication and conditions 63B.

The items 63A for authentication indicate types of data used for authenticating the extension module 51. The conditions 63B indicate conditions for authenticating the extension module 51.

As indicated by an entry 630, a condition 63B of an item 63A for authentication "authentication data" is "xyz!?ABC". As indicated by an entry 631, a condition 63B of an item 63A for authentication "power consumption" is "100 watts or less".

FIG. 9 shows a structure of the authentication answer table of the extension module 51 according to the first embodiment of this invention.

The authentication answer table 64 includes reply items 64A for authentication and answer data 64B.

The reply items 64A for authentication indicate types of answer data during authentication. The answer data 64B indicates answer data during the authentication.

As indicated by an entry 640, answer data 64B of a replay item 64A for authentication "authentication data" is "xyz-!?ABC". As indicated by an entry 641, answer data 64B of a reply item 64A for authentication "power consumption" is "80 watts".

Next, processing of each of the node control module 10, the module connectivity authentication interface 41, and the extension module 51 will be described in detail.

Figure 10:
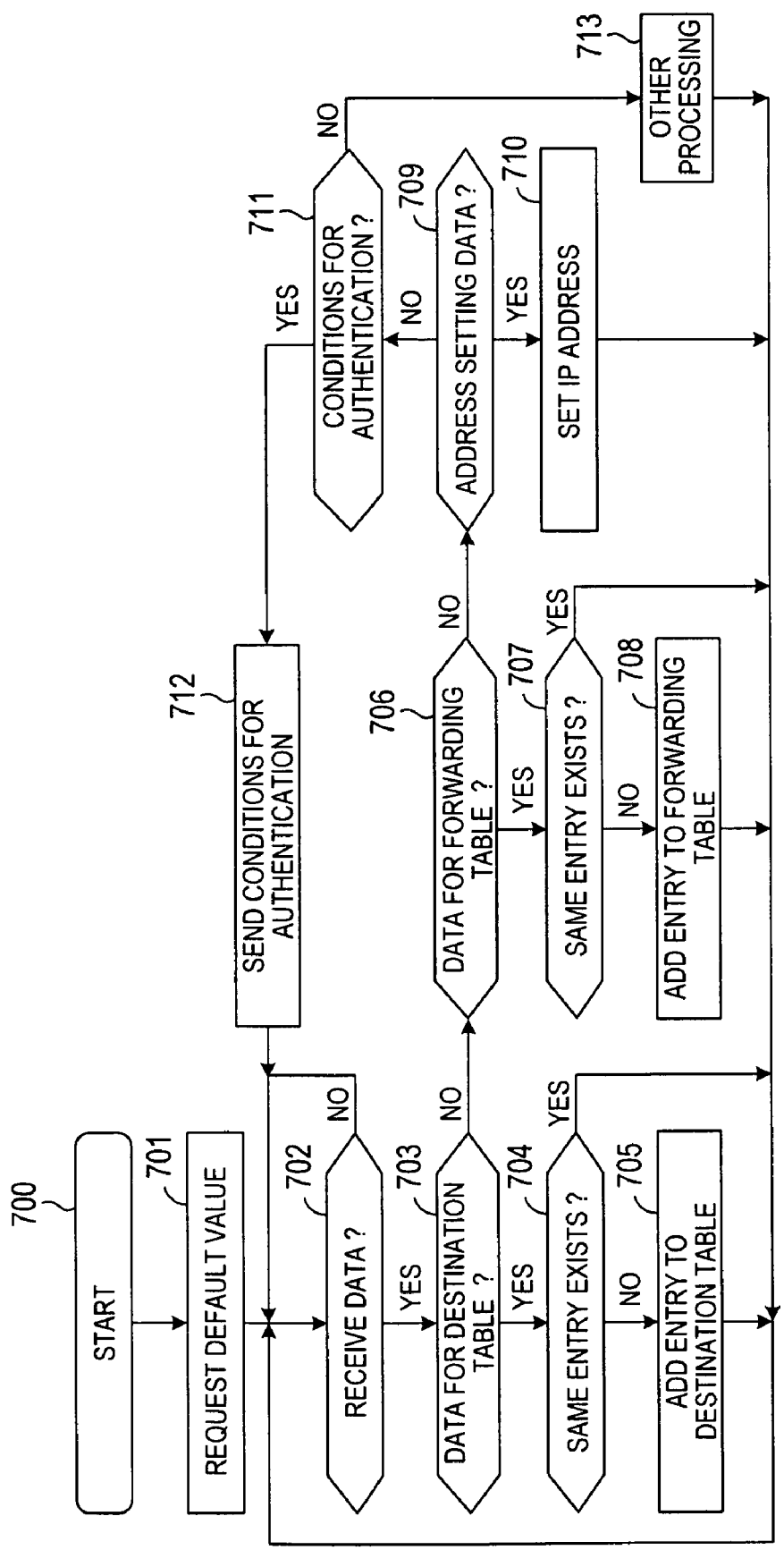
FIG. 10 is a flowchart of processing of a node control unit according to the first embodiment of this invention.

FIG. 10 is a flowchart of processing of the node control unit 15 according to the first embodiment of this invention.

When power is supplied to the node control module 10, this operation is started (Step 700).

First, the display unit 19 is instructed to display a request of inputting initial setting data (Step 701). The display unit 19 that has received the instruction displays a message of the inputting request of the initial setting data.

Next, determination is made as to reception of data from the input unit 18 or the internal header removing unit 13 (Step 702). If the data has not been received, the process stands by until reception.

Upon reception of the data, determination is made as to whether the received data is destination setting data or not (Step 703). The destination setting data contains a destination IP address and an internal address.

If the received data is destination setting data, determination is made as to presence of the same entry as that of the received data in the destination table 17 (Step 704). When entries are discovered where the IP address contained in the received data is identical to a destination IP address 61A and the internal address contained in the received data is identical to an internal address 61B, presence of the same entry in the destination table 17 is determined.

If the same entry is present in the destination table 17, the received data is discarded, and the process returns to Step 702.

On the other hand, if the same entry is not present in the destination table 17, the received data is stored in the destination table 17. Further, through the signal line L1, the received data is stored in the destination table 318 of each of the network interface modules 31 to 3n, and the received data is stored in the destination table 415 of the module connectivity authentication interface 41 (Step 705). Then, the process returns to Step 702.

The administrator can create the destination table 17 by repeatedly inputting the destination setting data to the input unit 18.

On the other hand, if the received data is not destination setting data in Step 703, determination is made as to whether the received data is forwarding setting data or not (Step 706). The forwarding setting data contains flow definition information and an internal address.

If the received data is forwarding setting data, determination is made as to presence of the same entry as that of the received data in the forwarding table 16 (Step 707). When entries are discovered where the flow definition information contained in the received data is identical to a flow definition information 60A, and the internal address contained in the received data is identical to an internal address 60B, presence of the same entry in the forwarding table 16 is determined.

If the same entry is present in the forwarding table 16, the received data is discarded, and the process returns to Step 702.

On the other hand, if the same entry is not present in the forwarding table 16, the received data is stored in the forwarding table 16. Further, through the signal line L2, the received data is stored in the forwarding table 316 of each of the network interface modules 31 to 3n (Step 708). Then, the process returns to Step 702.

On the other hand, if the received data is not forwarding setting data in Step 706, determination is made as to whether the received data is address setting data of the node control module or not (Step 709).

If the received data is IP address setting data, the received data is stored in the memory 20 (Step 710). Then, the process returns to Step 702.

On the other hand, if the received data is not address setting data in Step 709, determination is made as to whether the received data is condition data for authentication or not (Step 711). The condition data for authentication contains items for authentication and conditions.

If the received data is not condition data for authentication, route control processing or the like is executed (Step 713), and the process returns to Step 702.

On the other hand, if the received data is condition data for authentication, through the signal line L3, the received data is transmitted to the module authentication control unit 417 (Step 712). Then, the process returns to Step 702.

As described above, the node control unit 15 updates the forwarding table 16, the destination table 17, and the like.

Figure 11:
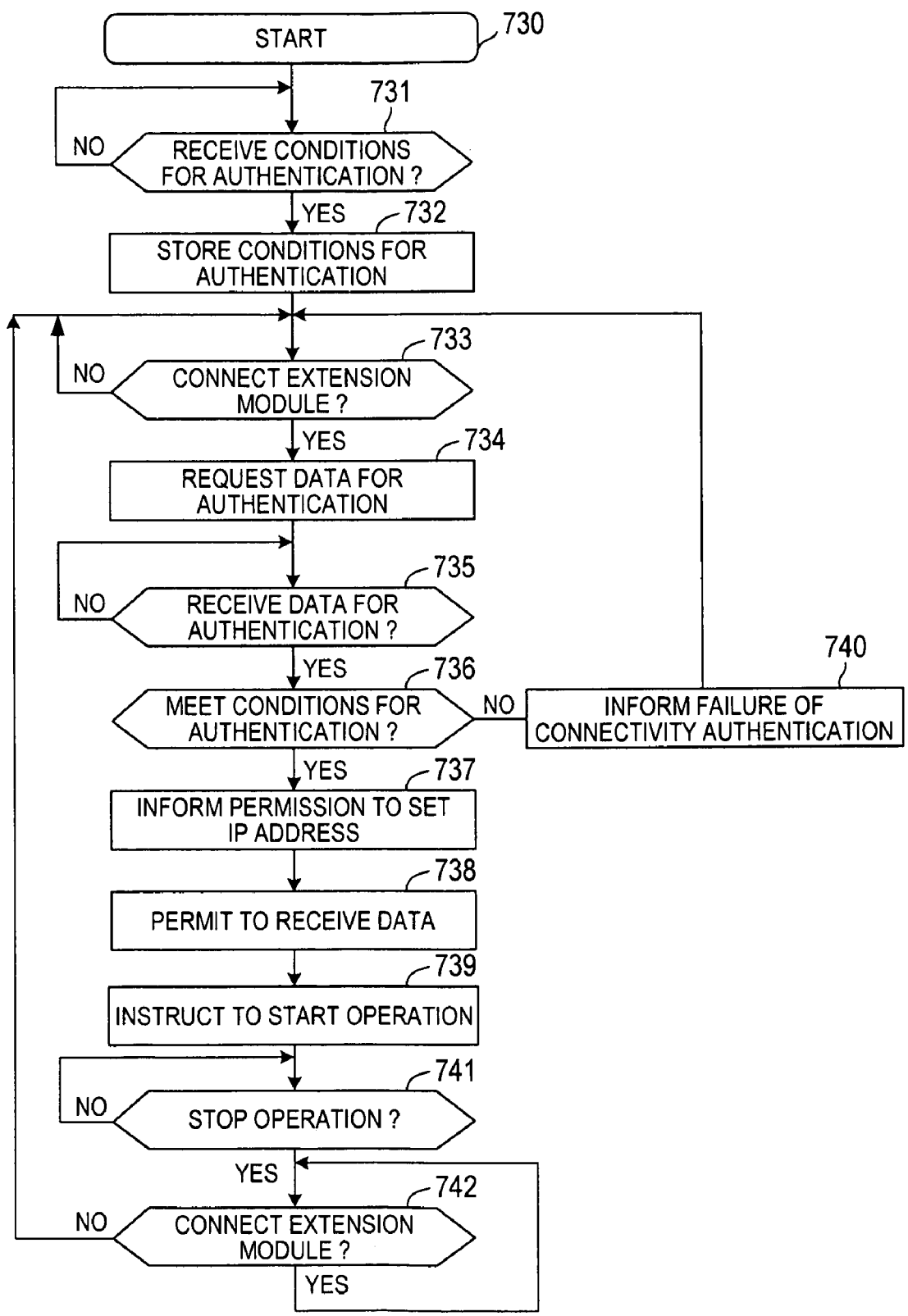
FIG. 11 is a flowchart, of processing of the module authentication control unit according to the first embodiment of this invention.

FIG. 11 is a flowchart of processing of the module authentication control unit 417 according to the first embodiment of this invention.

When power is supplied to the module connectivity authentication interface 41, this operation is started (Step 730).

First, determination is made as to reception of conditions for authentication from the node control unit 15 (Step 731). If the conditions for authentication have not been received, the process stands by until reception.

Upon reception of the conditions for authentication, the received data is stored in the authentication condition table 63 in the memory 420 (Step 732).

Next, based on an output from the module connection sensor 416, determination is made as to connection of the extension module 51 to the connector 419 (Step 733). If the extension module 51 has not been connected, the process stands by until connection.

Upon determination of the connection of the extension module 51, a request for module authentication data is transmitted to the module control unit 513 (Step 734). The request for module authentication data contains the items 63A for authentication stored in the authentication condition table 63.

Next, determination is made as to reception of the answer data 64B for authentication from the module control unit 513 (Step 735). If the answer data 64B for authentication has not been received, the process stands by until reception.

Upon reception of the answer data 64B for authentication, determination is made as to whether the received answer data 64B for authentication meets the conditions 63B of the authentication condition table 63 or not (Step 736).

If the answer data 64B for authentication does not meet the conditions 63B, a failure of authentication of the extension module 51 is informed to the module control unit 513 (Step 740). Then, the process returns to Step 733.

On the other hand, if the answer data 64B for authentication meets the conditions 63B, input permission of the IP address of the extension module 51 is informed to the module control unit 513 (Step 737). Next, the connection control unit 418 is permitted to receive data form the extension module 51 (Step 738). Then, the extension module 51 is instructed to start operation (Step 739).

Next, based on an input from a management console or the like, determination is made as to an end of the operation (Step 741).

If the operation have not ended, the process stands by until the end.

Upon the end of the operation, by using the module connection sensor 416, determination is made as to connection of the extension module 51 to the connector 419 (Step 742).

If the extension module 51 has been connected, the process stands by until the extension module 51 is disconnected.

Upon the disconnection of the extension module 51, the process returns to Step 733.

As described above, the module authentication control unit 417 can authenticate the extension module 51 whose function, performance, and safety are guaranteed.

Figure 12:
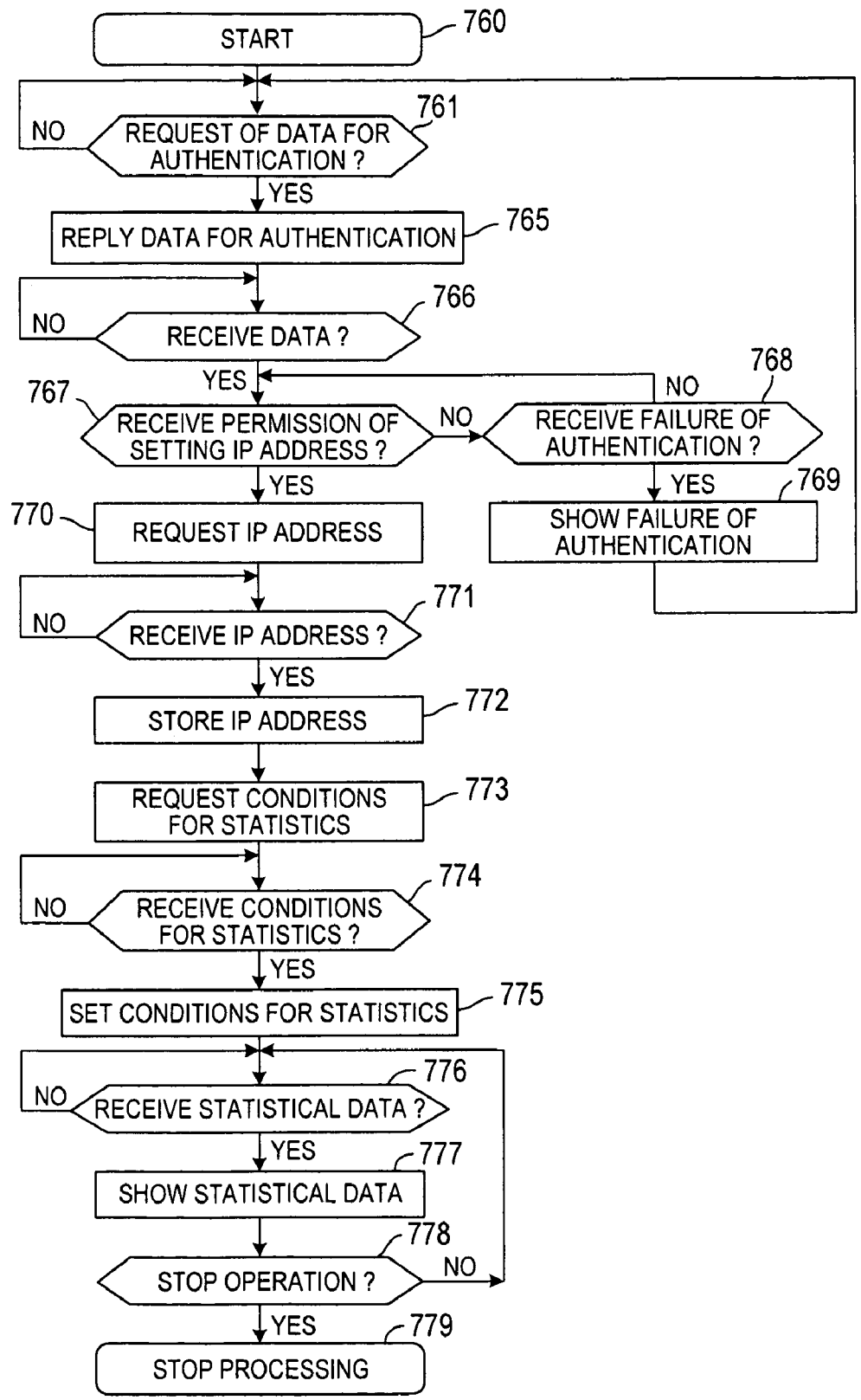
FIG. 12 is a flowchart of processing of the module control unit according to the first embodiment of this invention.

FIG. 12 is a flowchart of processing of the module control unit 513 according to the first embodiment of this invention.

When the extension module 51 is connected to the module connectivity authentication interface 41, this operation is started (Step 760).

First, determination is made as to reception of a request for module authentication data from the module authentication control unit 417 (Step 761). If the request for module authentication data has not been received, the process stands by until reception.

Upon reception of the request for module authentication data, entries where items 63A for authentication contained in the received request matches reply items 64A for authentication are extracted from the authentication answer table 64 in the memory 514. Next, answer data 64B of the extracted entries is transmitted to the module authentication control unit 417 (Step 765).

Next, determination is made as to reception of data from the module authentication control unit 417 (Step 766). If no data has been received from the module authentication control unit 417, the process stands by until reception.

Upon reception of data from the module authentication control unit 417, determination is made as to whether the received data is input permission of the IP address of the extension module 51 or not (Step 767).

If the received data is not input permission of the IP address of the extension module 51, determination is made as to whether the received data is notification of a failure of authentication or not (Step 768).

If the received data is not notification of a failure of authentication, the process returns to Step 767.

On the other hand, if the received data is notification of a failure of authentication, the display unit 512 is instructed to display the authentication failure (Step 769).

On the other hand, if the data received in Step 767 is input permission of the IP address of the extension module 51, the display unit 512 is instructed to display an input request of the IP address (Step 770).

Next, determination is made as to whether the IP address has been input or not from the input unit 511 (Step 771). If the IP address has not been input from the input unit 511, the process stands by until its input.

Upon the input of the IP address from the input unit 511, the IP address is stored in the memory 514 (Step 772). After the storage of the IP address, a request packet for updating the destination tables 17, 318 and 415 and the forwarding tables 16 and 317 may be transmitted to the module connectivity authentication interface 41.

In place of Steps 770 to 772, processing for validating the IP address prestored in the memory 514 may be executed.

Next, the display unit 512 is instructed to display an input request of conditions for statistics (Step 773). For example, the conditions for statistics are packet data measuring conditions per unit time, and various conditions used when the amount of data is measured by the packet data statistics unit 515.

Next, determination is made as to whether the conditions for statistics have been input or not from the input unit 511 (Step 774). If the conditions for statistics have not been input from the input unit 511, the process stands by until their input.

Upon the input of the conditions for statistics from the input unit 511, the input conditions for statistics are set in the packet data statistics unit 515 (Step 775). After the setting of the conditions for statistics, the packet data statistics unit 515 starts processing of statistics.

Next, determination is made as to reception of statistical data from the packet data statistics unit 515 (Step 776). The statistical data is a result of the statistical processing of the packet data statistics unit 515.

If the statistical data has not been received from the packet data statistics unit 515, the process stands by until reception.

Upon reception of the statistical data from the packet data statistics unit 515, the display unit 512 is instructed to display the received statistical data (Step 777).

Next, based on an input from the input unit 511, determination is made as to an end of operation (Step 778).

If the operation has not ended, the process returns to Step 776.

On the other hand, if the operation ends, this operation ends (Step 779).

As described above, the module control unit 513 transmits authentication information to the module connectivity authentication interface 41. After the authentication of the extension module 51, the module control unit 513 instructs the packet data statistics unit 515 to start statistical processing.

According to the first embodiment, the extension module 51 stores the valid answer data 64B for authentication only when its function, performance and safety are guaranteed.

Thus, by checking the answer data 64B, the module connectivity authentication interface 41 can prevent connection of an extension module 51 whose function, performance and safety are not guaranteed.

The node apparatus 1 for packet communication can authenticate connection of an extension module without registering data of a developer or a user.

Furthermore, the node apparatus 1 for packet communication processes authentication not at the node control module 10 but at the module connectivity authentication interface 41. As a result, in the node apparatus 1 for packet communication, control of the entire apparatus is not adversely affected even when an illegal extension module 51 is connected. Moreover, no reduction occurs in throughput as the node control module 10 does not process authentication.

Second Embodiment

A node apparatus 1 for packet communication according to a second embodiment determines an abnormality of a connected extension module 51.

The node apparatus 1 for packet communication according to the embodiment is similar in configuration to that of the first embodiment except for a module connectivity authentication interface 41, and thus description thereof will be omitted.

Upon authentication of the extension module 51, the module connectivity authentication interface 41 of the first embodiment permits communication with the extension module 51.

On the other hand, the module connectivity authentication interface 41 of the second embodiment makes determination as to transmission of abnormal data from the extension module 51 in addition to the operation of the first embodiment. When the abnormal data is sent, the data from the extension module 51 is blocked.

Figure 13:
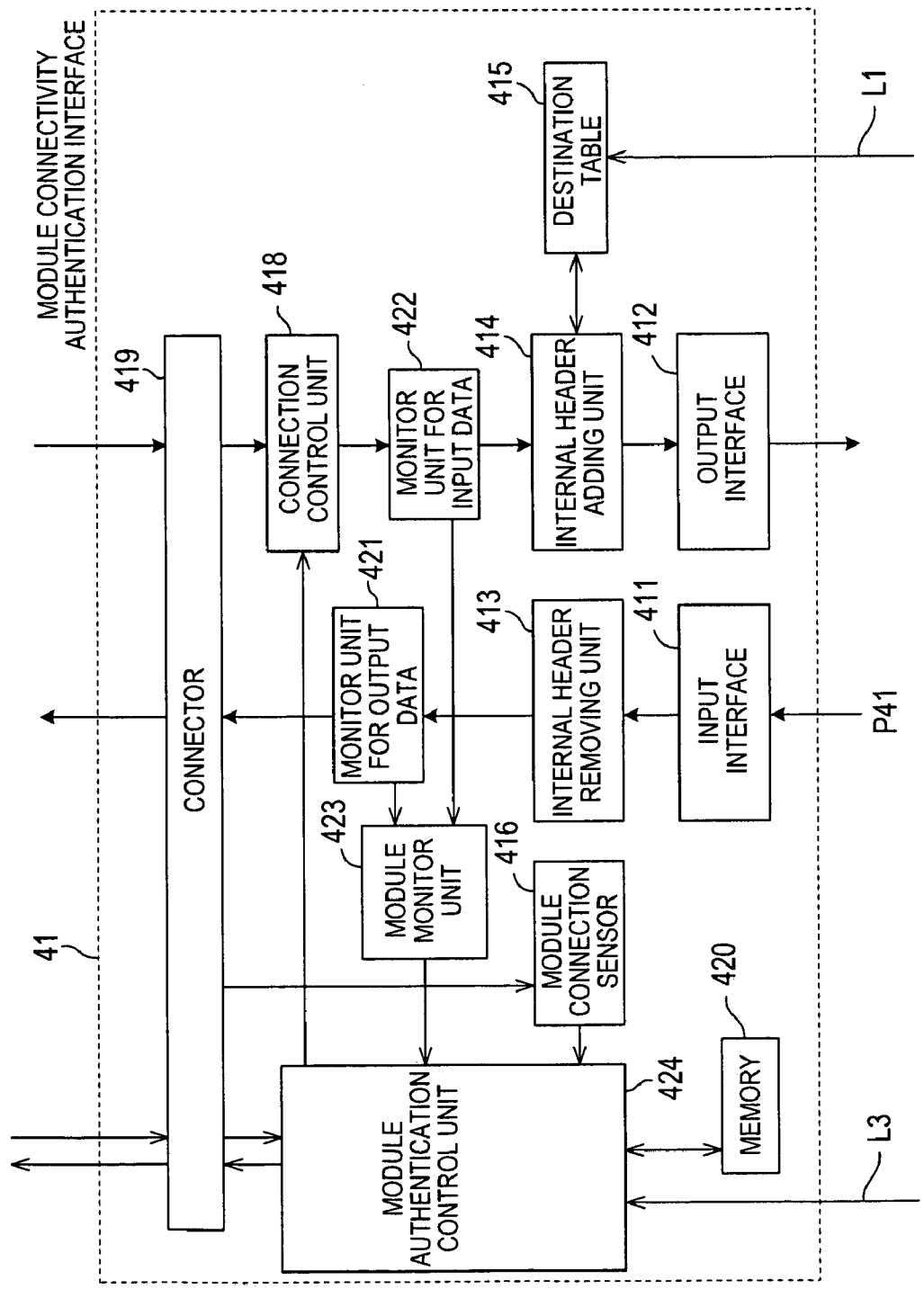
FIG. 13 is a block diagram of the module connectivity authentication interface according to a second embodiment of this invention.

FIG. 13 is a block diagram of the module connectivity authentication interface 41 according to the second embodiment of this invention.

The module connectivity authentication interface 41 of the second embodiment includes a monitor unit 421 for output data, a monitor unit 422 for input data, a module monitor unit 423, and a module authentication control unit 424. Other components are similar to those of the module connectivity authentication interface 41 of the first embodiment shown in FIG. 7. The components similar to those of the first embodiment are denoted by similar reference numerals, and description thereof will be omitted.

The monitor unit 421 for output data measures the amount of data transmitted to the extension module 51 per unit time, and informs a result of the measurement to the module monitor unit 423. The monitor unit 422 for input data measures the amount of data received from the extension module 51 per unit time, and informs a result of the measurement to the module monitor unit 423.

The module monitor unit 423 compares the results of the measurements of the monitor units 421 and 422 for input and output data with each other to determine an abnormality of the extension module 51. Specifically, the module monitor unit 423 determines the occurrence of an abnormality in the extension module 51 when a difference between the measuring results is large. It is because the amounts of data to be received and transmitted are equal to each other as the extension module 51 has a function of measuring the amount of data for a specific flow.

Upon determination of the abnormality of the extension module 51, the module monitor unit 423 informs the abnormality of the extension module 51 to the module authentication control unit 424.

As described below by referring to FIG. 14, the module authentication control unit 424 performs authentication and abnormality determination of the extension module 51.

Figure 14:
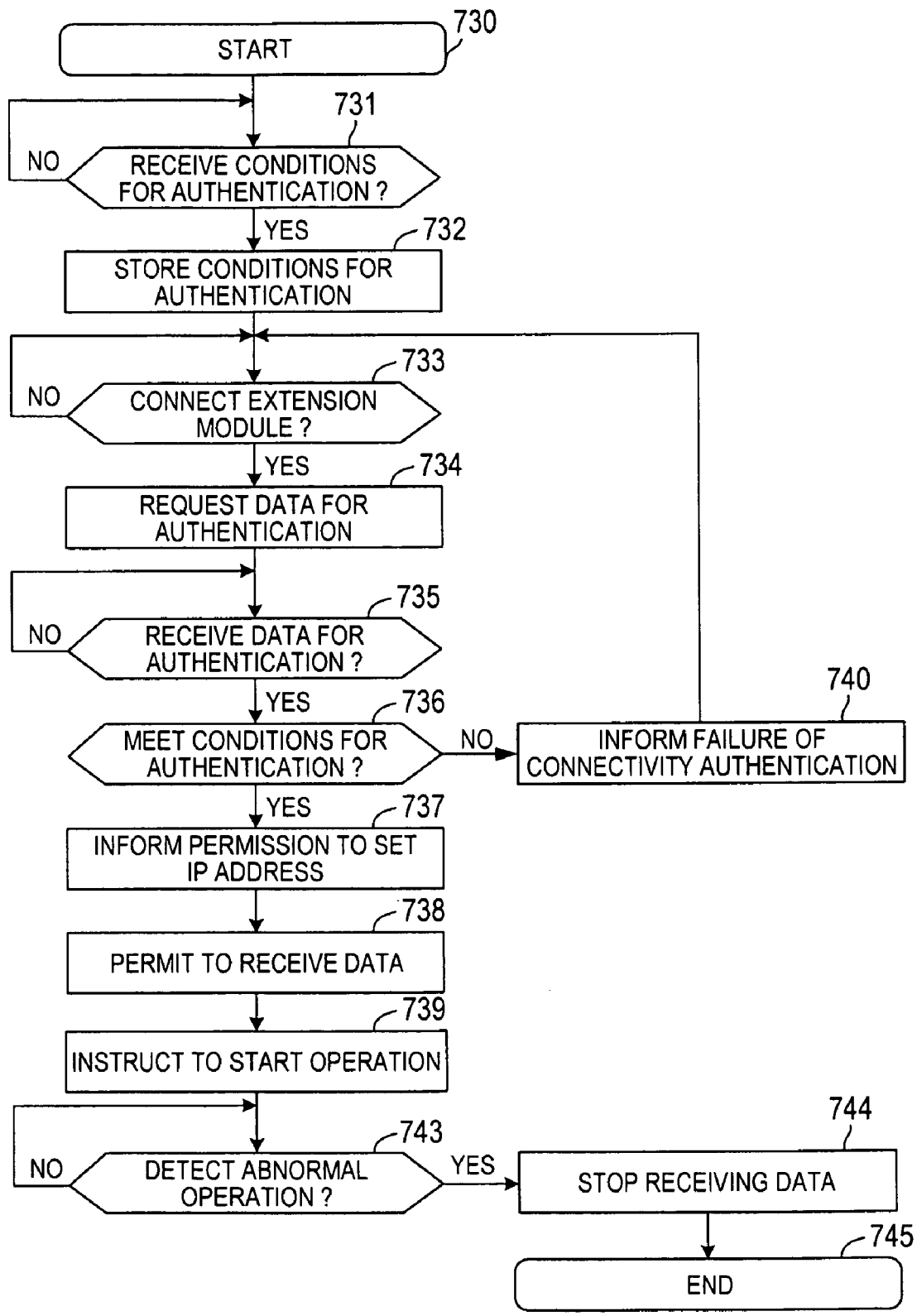
FIG. 14 is a flowchart of processing of the module authentication control unit according to the second embodiment of this invention.

FIG. 14 is a flowchart of processing of the module authentication control unit 424 according to the second embodiment of this invention.

Processing Steps 730 to 740 of the module authentication control unit 424 of the second embodiment are similar to those of the module authentication control unit 417 of the first embodiment, and thus description thereof will be omitted. The similar steps are denoted by similar reference numerals.

When the extension module 51 is instructed to start operation in Step 739, determination is made as to reception of an abnormality notification of the extension module 51 from the module monitor unit 423 (Step 743).

If the abnormality notification of the extension module 51 has not been received, the process stands by until reception.

Upon reception of the abnormality notification of the extension module 51, a connection control unit 418 is instructed to stop reception of data from the extension module 51 (Step 744). Then, this operation ends (Step 745).

As described above, the module connectivity authentication interface 41 determines the abnormality of the extension module 51. The module connectivity authentication interface 41 may determine the abnormality of the extension module 51 based on other pieces of information such as the number of flows per unit time.

According to the second embodiment, upon detection of transmission of abnormal data from the extension module 51, the module connectivity authentication interface 41 stops reception of data from the extension module 51. As a result, it is possible to prevent transmission of illegal data from the node apparatus 1 for packet communication to the outside.

For example, even when the extension module 51 is contaminated with viruses, or used as a base for illegal access, an illegal operation of the extension module 51 can be prevented as the module connectivity authentication interface 41 determines the abnormality of the extension module 51.

Third Embodiment

A node apparatus 1 for packet communication according to a third embodiment authenticates an extension module 51 by checking its function.

Components of the third embodiment are similar to those of the first embodiment except for a module connectivity authentication interface 41 and an extension module 51, and thus description thereof will be omitted.

The module connectivity authentication interface 41 of the first embodiment authenticates the extension module 51 by using the data for authentication.

On the other hand, the module connectivity authentication interface 41 of the third embodiment transmits packet data for authentication to the extension module 51. Then, the module connectivity authentication interface 41 authenticates an extension module 51 only where the amount of packet data for authentication can be correctly measured.

Figure 15:
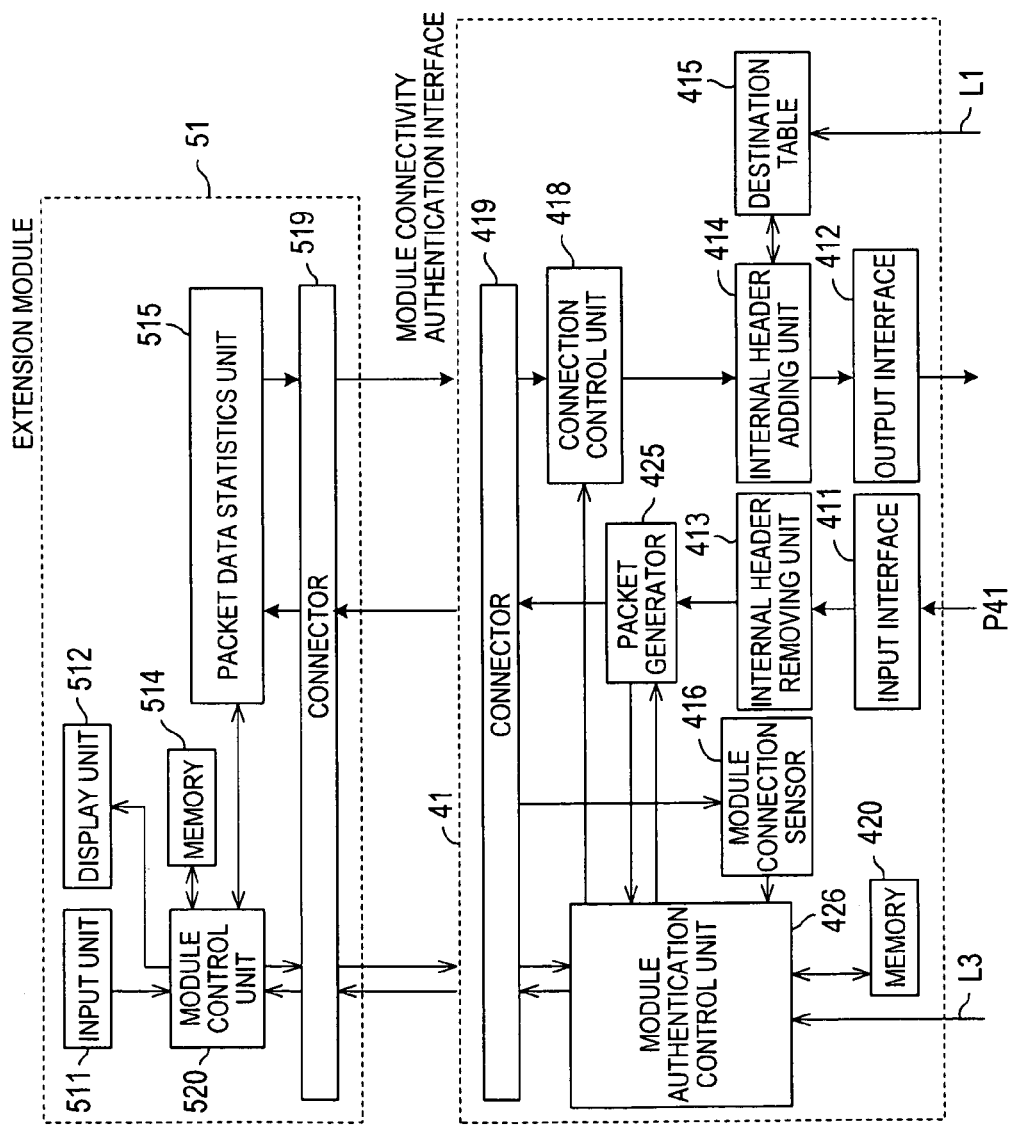
FIG. 15 is a block diagram of the module connectivity authentication interface and the extension module according to a third embodiment of this invention.

FIG. 15 is a block diagram of the module connectivity authentication interface 41 and the extension module 51 according to the third embodiment of this invention.

The module connectivity authentication interface 41 of the third embodiment includes a packet generator 425 and a module authentication control unit 426. Other components are similar to those of the module connectivity authentication interface 41 of the first embodiment shown in FIG. 7. The similar components are denoted by similar reference numerals, and description thereof will be omitted.

The packet generator 425 generates packet data for authentication, and transmits it to the extension module 51. As described below by referring to FIG. 16, the module authentication control unit 426 authenticates the extension module 51.

The extension module 51 of the third embodiment includes a module control unit 520. Other components are similar to those of the extension module 51 of the first embodiment shown in FIG. 7. The similar components are denoted by similar reference numerals, and description thereof will be omitted.

As described below by referring to FIG. 17, the module control unit 520 controls the entire extension module.

Figure 16:
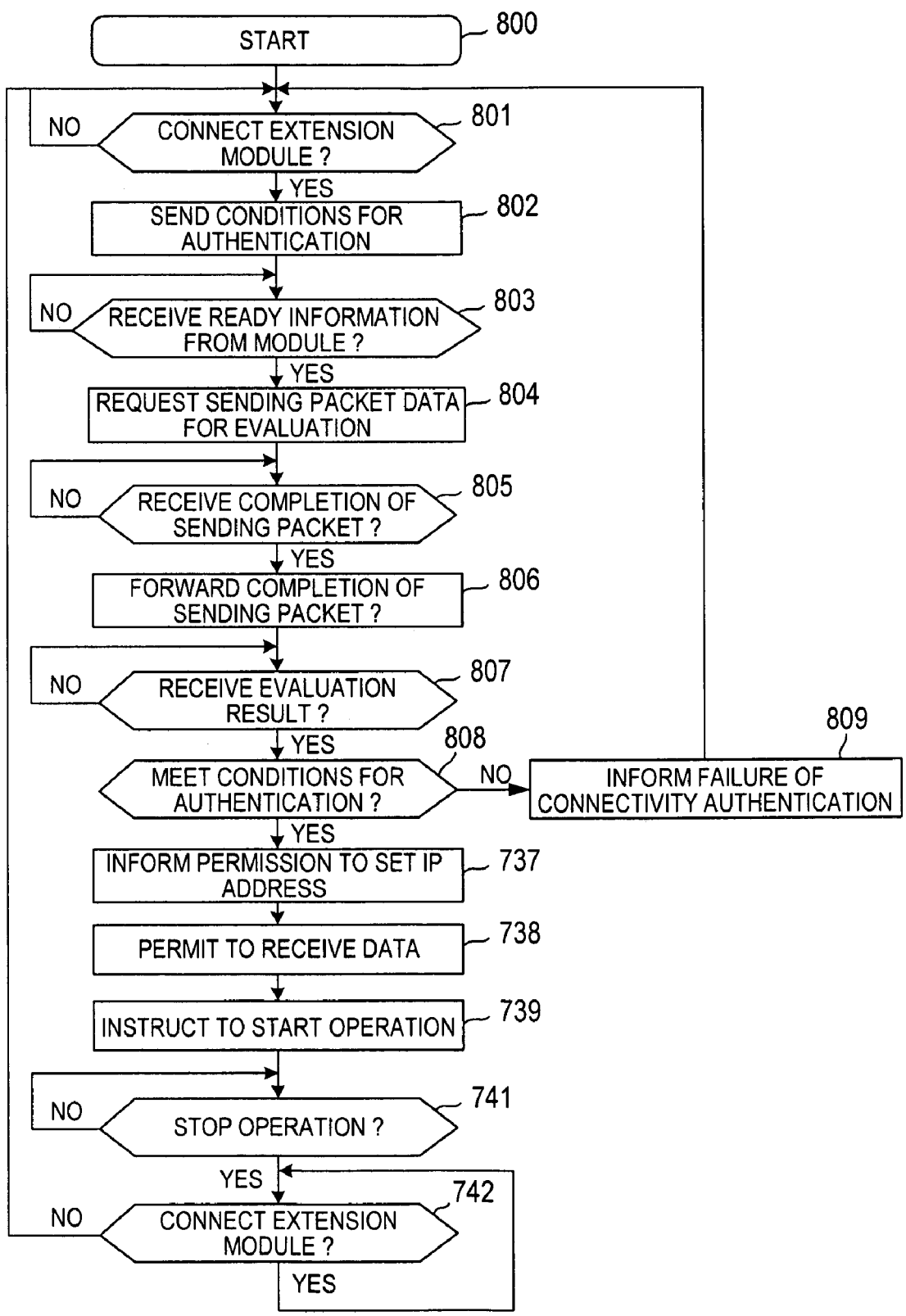
FIG. 16 is a flowchart of processing of the module authentication control unit of the third embodiment of this invention.

FIG. 16 is a flowchart of processing of the module authentication control unit 426 of the third embodiment of this invention.

When power is supplied to the module connectivity authentication interface 41, this operation is started (Step 800).

First, based on an output from a module connection sensor 416, determination is made as to connection of the extension module 51 to a connector 419 (Step 801).

If the extension module 51 has not been connected, the process stands by until connection thereof.

Upon connection of the extension module 51, connection permission conditions are transmitted to the module connection control unit 520 (Step 802). The connection permission conditions indicate types of function tests to authenticate connection of the extension module 51, e.g., information of a test as to whether the extension module 51 has a function of measuring the amount of data or not. The type of a function test can be specified by presetting a corresponding number.

Next, determination is made as to reception of measurement preparation completion data from the extension module 51 (Step 803). The measurement preparation completion data indicates that the extension module 51 has completed the function test preparation.

If the measurement preparation completion data has not been received, the process stands by until reception. Upon reception of the measurement preparation completion data, the packet generator 425 is instructed to transmit packet data for measurement (Step 804). However, the amount of packet data for measurement may be instructed by the module authentication control unit 426, or preset.

The packet generator 425 that has received the instruction transmits packet data for testing to the extension module 51. Then, upon completion of the transmission, the packet generator 425 informs the transmission completion of the packet data for measurement to the module authentication control unit 426.

Next, determination is made as to reception of the notification of the transmission end of the packet data for measurement from the packet generator 425 (Step 805). If the notification of the transmission end of the packet data for measurement has not been received, the process stands by until reception.

Upon reception of the notification of the transmission end of the packet data for measurement, the received notification is forwarded to the module control unit 520 (Step 806).

Next, determination is made as to reception of measuring result data from the module control unit 520 (Step 807). The measuring result data contains the amount of data measured by packet data statistics unit 515.

If the measuring result data has not been received, the process stands by until reception. Upon reception of the measuring result data, determination is made as to whether the measuring result data meets authentication conditions or not (Step 808). Specifically, when the received measuring result data matches the amount of packet data for authentication, the data is determined to meet the authentication conditions.

If the measuring result data does not meet the authentication conditions, a failure of authentication of the extension module 51 is informed to the module control unit 520 (Step 809), and the process returns to Step 801.

On the other hand, if the measuring result data meets the authentication conditions, processing of Steps 737 to 742 is executed. Steps 737 to 742 are similar to those of the module authentication control unit 417 of the first embodiment of this invention shown in FIG. 11, and thus description thereof will be omitted.

Figure 17:
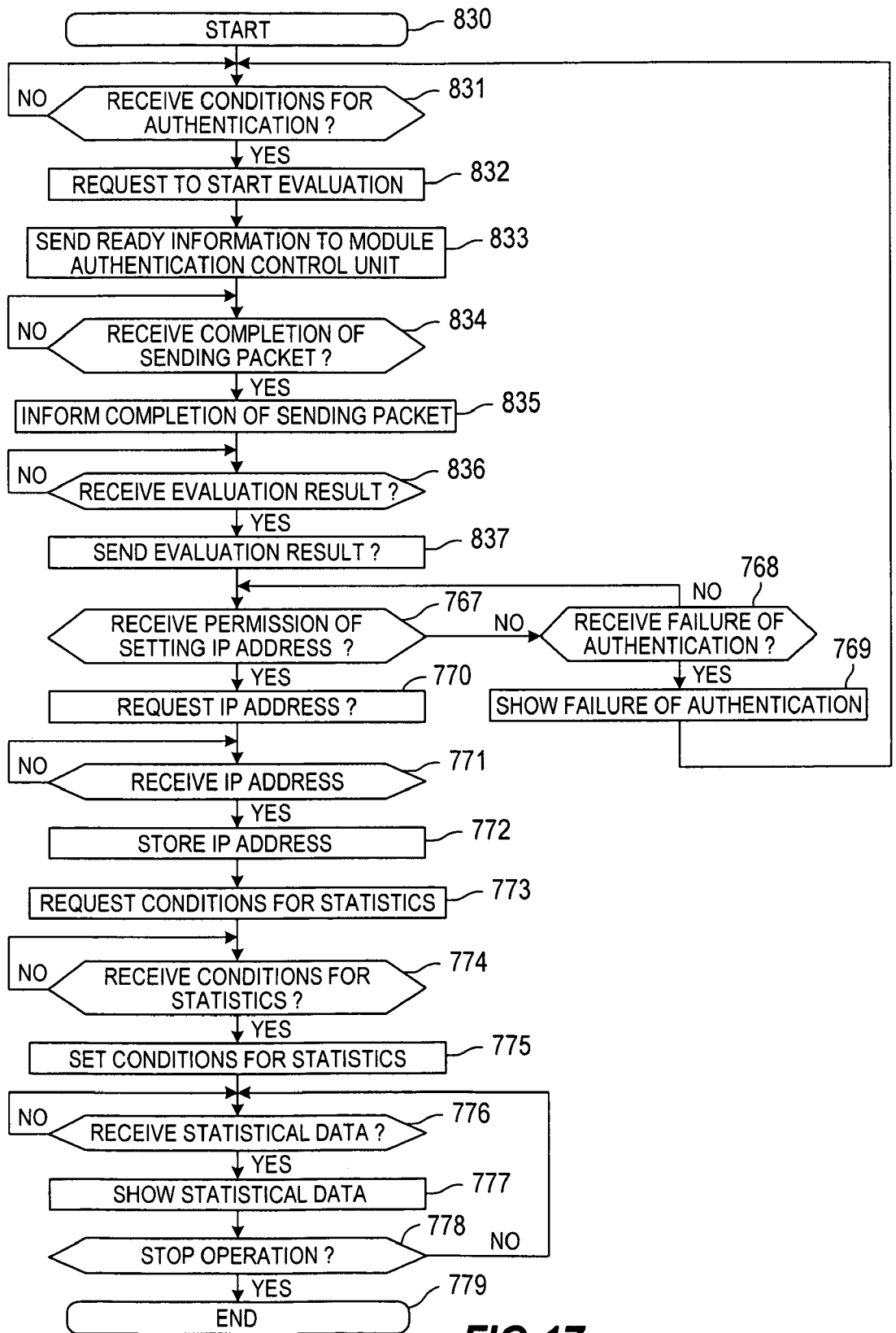
FIG. 17 is a flowchart of processing of the module control unit according to the third embodiment of this invention.

FIG. 17 is a flowchart of processing of the module control unit 520 according to the third embodiment of this invention.

When the extension module 51 is connected to the module connectivity authentication interface 41, this operation is started (Step 830).

First, determination is made as to reception of connection permission conditions from the module authentication control unit 426 (Step 831). If the connection permission conditions have not been received, the process stands by until reception.

Upon reception of the connection permission conditions, preparation of a function test indicated by the connection permission conditions is started. The function test of the embodiment is for measuring the amount of data transmitted from the module connectivity authentication interface 41. Accordingly, the packet data statistics unit 515 is instructed to start measurement of the amount of data (Step 832).

Subsequently, measuring preparation completion data is transmitted to the authentication control unit 426 (Step 833).

Next, determination is made as to reception of a notification of a transmission end of packet data for measurement from the module authentication control unit 426 (Step 834). If the notification of the transmission end of the packet data for measurement has not been received, the process stands by until reception.

Upon reception of the notification of the transmission end of the packet data for measurement, the packet data statistics unit 515 is instructed to finish the measurement (Step 835).

Next, determination is made as to reception of the measuring result data from the packet data statistics unit 515 (Step 836). If the measuring result data has not been received, the process stands by until reception.

Upon reception of the measuring result data, the received measuring result data is forwarded to the module authentication control unit 426 (Step 837). Thereafter, processing of Steps 767 to 779 is executed. Steps 767 to 797 are similar to those of the module control unit 513 of the first embodiment of this invention shown in FIG. 12, and thus description will be omitted.

According to the third embodiment, the module connectivity authentication interface 41 authenticates an extension module 51 only which satisfies required specifications (function and performance). Thus, it is possible to prevent careless connection of an extension module 51 which does not satisfy the required specifications.

This invention can be applied to a communication node apparatus which forwards data through a network. By applying the invention, it is possible to completely connect an extension module for executing new processing to the communication node apparatus. For example, the invention can be applied in the case of replacing an extension module for enhancing on-going processing, or in the case of redundantly connecting an extension module for executing the same processing as that of existing processing for enhancing throughput.

While the present invention has been described in detail and pictorially in the accompanying drawings, the present invention is not limited to such detail but covers various obvious modifications and equivalent arrangements, which fall within the purview of the appended claims.

What is claimed is:

1. A node apparatus for packet communication to which an extension module for executing predetermined processing is connected and which forwards packet data to the extension module, the extension module comprising a memory for storing connectivity authentication data, and a module controller for transmitting the connectivity authentication data stored in the memory to the node apparatus for packet communication when the connectivity authentication data is requested from the node apparatus for packet communication, the node apparatus for packet communication comprising:

a switching unit;

a network interface module connected to the switching unit, the network interface module receiving packet data from and forwarding packet data to a network; and a module connectivity authentication interface connected to the switching unit, the module connectivity authentication interface including:

a connectivity authentication unit for authenticating permission of connection of the extension module based on the connectivity authentication data received from the extension module;

a connection controller for receiving packet data from the extension module when the connectivity authentication unit authenticates the permission of the connection; and a module monitor unit for detecting whether there is an abnormality of the extension module based on a difference between an amount of the packet data forwarded to the extension module by the node apparatus and an amount of the packet data received from the extension module and, upon detecting that there is an abnormality of the extension module, notifying the connectivity authentication unit of the abnormality, and wherein the connectivity authentication unit, upon being notified of the abnormality, instructs the connection controller to stop receiving packet data from the extension module.

2. The node apparatus for packet communication according to claim 1, further comprising a node controller for controlling the entire node apparatus for packet communication.

3. The node apparatus for packet communication according to claim 2, wherein the node controller directly transfers data to the connectivity authentication unit while the connectivity authentication unit does not directly transmit data to the node controller.

4. The node apparatus for packet communication according to claim 1, wherein the connection controller does not receive the packet data from the extension module before the connectivity authentication unit permits the connection.

5. The node apparatus for packet communication according to claim 1, further comprising a function monitor for determining whether a function of the extension module satisfies connection conditions or not, wherein the connectivity authentication unit permits connection only for an extension module determined to satisfy the connection conditions by the function monitor.

* * * * *